United States Patent
Maes et al.

(10) Patent No.: US 7,379,733 B2
(45) Date of Patent: May 27, 2008

(54) MOBILE MEETING AND COLLABORATION

(75) Inventors: Stephane H. Maes, Fremont, CA (US); John Dolan, San Francisco, CA (US); Gaurav Kuchhal, Redwood City, CA (US); Jacob Christfort, San Francisco, CA (US); Jean Sini, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 386 days.

(21) Appl. No.: 10/857,659

(22) Filed: May 28, 2004

(65) Prior Publication Data

US 2004/0266412 A1    Dec. 30, 2004

Related U.S. Application Data

(60) Provisional application No. 60/482,513, filed on Jun. 25, 2003.

(51) Int. Cl.
*H04M 3/42*    (2006.01)
(52) U.S. Cl. .................. 455/414.1; 455/416
(58) Field of Classification Search .......... 455/414.1, 455/414.3, 416, 420, 412.1
See application file for complete search history.

(56) References Cited

U.S. PATENT DOCUMENTS

| | | | |
|---|---|---|---|
| 5,850,517 A | 12/1998 | Verkler et al. | |
| 6,157,941 A | 12/2000 | Verkler et al. | |
| 6,856,809 B2 * | 2/2005 | Fostick | 455/466 |
| 2003/0104805 A1 * | 6/2003 | Weksel | 455/414 |
| 2003/0191805 A1 * | 10/2003 | Seymour et al. | 709/204 |
| 2003/0211856 A1 * | 11/2003 | Zilliacus | 455/466 |
| 2004/0119814 A1 * | 6/2004 | Clisham et al. | 348/14.08 |
| 2004/0152454 A1 * | 8/2004 | Kauppinen | 455/414.3 |
| 2005/0021624 A1 * | 1/2005 | Herf et al. | 709/204 |
| 2005/0101338 A1 * | 5/2005 | Kraft | 455/466 |
| 2005/0144233 A1 * | 6/2005 | Kjesbu et al. | 709/204 |

* cited by examiner

*Primary Examiner*—Blane J. Jackson
(74) *Attorney, Agent, or Firm*—Townsend and Townsend and Crew LLP (57) ABSTRACT

A method for enabling a mobile device to view one or more slides in a presentation is provided. The method comprises: determining when slides for the presentation have been changed; when a slide has been changed, performing the steps of: determining a current slide in the one or more slides being displayed; and sending a message, to the mobile device, indicating that the current slide has been displayed, wherein the message enables the current slide to be displayed on the mobile device.

33 Claims, 5 Drawing Sheets

MOBILE MEETING AND COLLABORATION

CROSS-REFERENCES TO RELATED APPLICATIONS

This application claims the benefit of the filing date of U.S. Provisional Patent Application No. 60/482,513, filed Jun. 25, 2003, which is incorporated by reference in its entirety for all purposes.

BACKGROUND OF THE INVENTION

The present invention generally relates to mobile meetings and collaboration. More particularly, the present invention relates to methods and apparatus for enabling mobile devices to schedule and participate in meetings.

Meetings typically include some kind of multimedia presentation, for example, a slide show presentation. Thus, people who are not present at the slide show will not fully appreciate the presentation. A person not at the meeting may participate through a teleconference and manually change hard copies of the slides while the presentation is being given. However, the person must be given a verbal cue when slides are changed or determine on his or her own that a new slide is being displayed.

Currently, a presentation being given may be displayed on a remote television or computer through a video conference. This, however, requires expensive video conferencing equipment and a dedicated high-speed Internet connection. Also, the remote location is typically another meeting room in a remote office thereby requiring users to be present in the meeting room. Thus, if a user is traveling, a user may not have access to the required equipment to participate in a video conference. Rather, the user may only have a mobile device, such as a cellular phone. In this case, the user may participate through a tele-conference and manually change physical copies of the slides. However, once again, the user must receive cues that the slides have been changed or decide when to change the slides.

In all of the above cases, the user has been a participant in the meeting and not the presenter. If the user is not present and is, for example, at an airport, the user cannot effectively run the presentation. Once again, the user may only have a mobile device, such as a cellular phone; thus, the user cannot change the slides of a presentation for everyone in the meeting to see. Rather, the user is restricted to participating through a tele-conference while the slides of the presentation are changed by someone else. In this case, the user must verbally say when slides should be changed.

In another example, a user may schedule a meeting, such as a tele-conference. Reminders may be sent to a mobile device when a meeting is about to begin. However, the reminders may just indicate that a meeting will start at a certain time. At the time of receiving the reminder, the user may not have access to information needed to connect to the tele-conference because the user may not be in his or her office, etc. Thus, the reminder would be useless because the user cannot connect to the meeting.

Accordingly, what is desired are methods and apparatus for addressing the above drawbacks for scheduling and participating in meetings via mobile devices.

BRIEF SUMMARY OF THE INVENTION

Embodiments of the present invention relate to the coordination and participation in meetings using a mobile device. A user of a mobile device may be automatically reminded and connected to a meeting. Further, the user can automatically view slides in a presentation as they are changed and run a presentation using a mobile device.

In one embodiment, a method for enabling a mobile device to view one or more slides in a presentation is provided. The method comprises: determining when slides for the presentation have been changed; when a slide has been changed, performing the steps of: determining a current slide in the one or more slides being displayed; and sending a message, to the mobile device, indicating that the current slide has been displayed, wherein the message enables the current slide to be displayed on the mobile device.

In another embodiment, a method for running a presentation of one or more slides from a mobile device is provided. The presentation is being viewed by one or more participants using one or more computing devices that are in communication with one or more display devices associated with the one or more participants. The method comprises: receiving a message to display a new slide for the presentation from the mobile device that is remotely located from the one or more display devices; determining the one or more display devices that are participating in the meeting; and sending a message indicating that a new slide should be displayed to each of the one or more display devices, wherein the message causes the one or more display devices to display the new slide.

In one embodiment, a method for coordinating and participating in a meeting using a mobile device is provided. The method comprises: receiving, for the mobile device, a request to participate in a meeting, wherein a user will participate in the meeting using the mobile device; storing temporal information for the meeting; determining when to remind a user of the meeting based on the stored temporal information; and sending a message to the mobile device for the meeting, the message enabling the mobile device to automatically connect to the meeting.

Embodiments of the present invention may also be included on computer readable media.

A further understanding of the nature and the advantages of the inventions disclosed herein may be realized by reference of the remaining portions of the specification and the attached drawings.

DETAILED DESCRIPTION OF THE INVENTION

Embodiments of the present invention allow a user to use a mobile device to coordinate and set up meetings. The mobile device is sent a reminder for a meeting that may automatically connect the mobile device to the meeting or include a link that, upon selection, will automatically connect the user to the meeting. Also, the user of a mobile device may participate in a meeting where a presentation is being given. The slides of a presentation are automatically changed on the mobile device as they are changed in the presentation being given. Additionally, a user giving a presentation may use the mobile device to cause presentation slides to be changed automatically on other devices.

Figure 1:
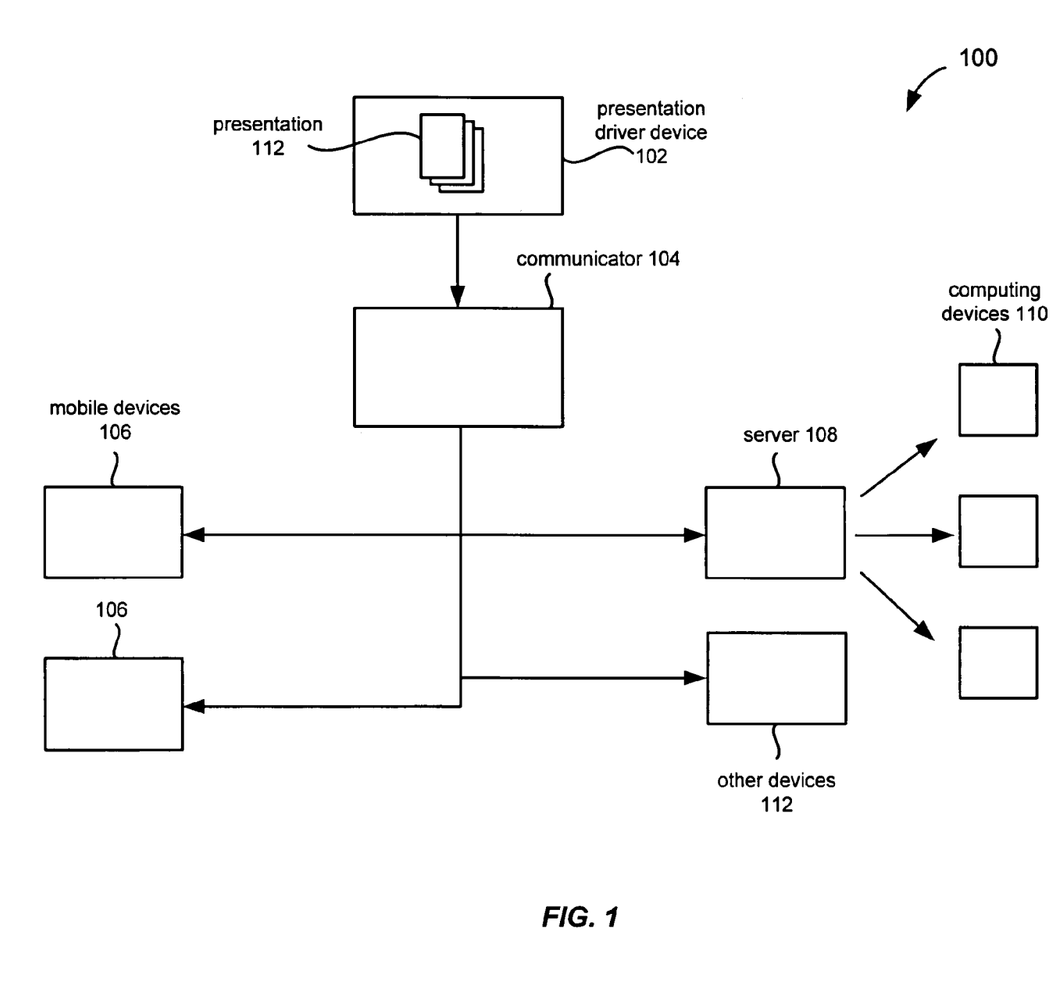
FIG. 1 depicts a system for providing a presentation according to one embodiment of the present invention.

FIG. 1 depicts a system 100 for providing a presentation according to one embodiment of the present invention. System 100 includes a presentation driver device 102, a communicator 104, mobile devices 106, a server 108, computing devices 110, and other devices 112.

Mobile devices 106 are any devices that can receive communications from communicator 104. Examples include cellular phones, personal assistants (PDAs), personal computers, pagers, etc.

Server 108 and computing devices 110 are included to represent a computer network, such as a corporate network. Server 108 receives messages from communicator 104 and propagates them to computing devices 110.

Other devices 112 may be any computing devices, another presentation driver device 102 in another office, a television, a display screen, or any other device configured to display slides from presentation 112.

Presentation driver device 102 is any device that is used to display a presentation on a display device. For example, presentation driver device 102 is a computing device that includes or can retrieve slides from presentation 112. For example, a personal computer that has a slide show presentation stored locally may be used. Presentation 112 is typically an electronic document that includes one or more pages or slides. Presentation driver device 102 display pages for presentation 112 on a television, screen, computer, etc.

When a slide should be changed, a user sends a command to presentation driver device 102. For example, when a user desires to display the next slide in presentation 112, the user may select a key on an input device of presentation driver device 102, such as a keyboard or mouse. Presentation driver device 102 would then display the next slide on the display.

In one embodiment, mobile devices 106 are devices that are not directly connected to presentation driver device 102. For example, presentation driver device 102 may be a laptop that includes software to display a slide on a screen. Also, software may be used to display the slide on a screen remotely, as in a teleconference. These examples require specialized presentation software that is configured to display slides from presentations. Mobile devices 106 may not be configured to directly interact with presentation driver device 102. For example, the communication channel that mobile devices 102 communicate in may not allow for slides as formatted (e.g., a Microsoft Powerpoint™ format) in presentation driver device 102 to be sent. Mobile devices may communicate using SMS or MMS, and thus messages in SMS or pictures of slides in MMS may need to be sent.

Accordingly, as will be described below, communicator 104 may send a message that the slide has been changed or it may send a message that includes an image of the current slide being displayed. When a new slide is displayed, presentation driver device 102 sends a message to communicator 104 indicating that a new slide has been displayed. In another embodiment, communicator 104 may periodically monitor the status of presentation 112 and determine when a change in presentation 112 has occurred. When a new slide has been displayed, communicator 104 sends messages to mobile devices 106, server 108, and other devices 112 to notify them of the slide change. If a message that the slide has been changed is sent, the message may cause the receiving device to automatically retrieve and display the currently displayed slide. If an image of the slide is sent, the message may cause the receiving device to automatically display the received slide.

Figure 2:
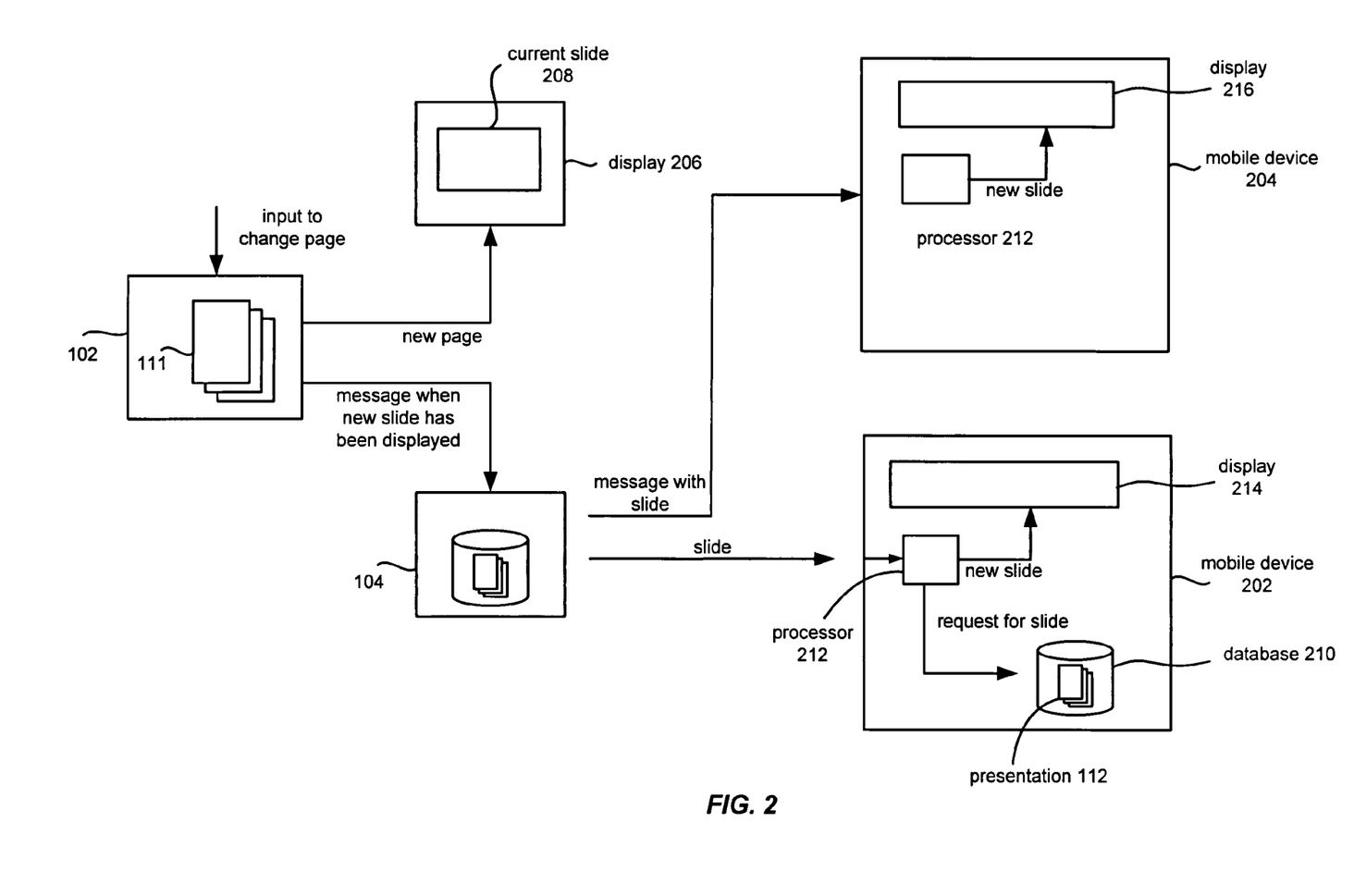
FIG. 2 illustrates the embodiment where users view slides in a presentation using mobile devices.

In one embodiment, a user uses a mobile device 106 to view slides in a presentation being given by another and also uses mobile device 106 to give a presentation. FIG. 2 illustrates the embodiment where users view slides in a presentation 112 using mobile devices. In one embodiment, a mobile device 202 includes a copy or can retrieve a copy of the slides of presentation 112 and a mobile device 204 cannot access any slides of presentation 112.

As shown, presentation driver device 102 receives input to change a page of presentation 112. For example, a next page key may be pressed on a computer. Presentation driver device 102 then sends a current slide 208 to a display 206 for display. When a new page has been accessed in presentation 112, a message is sent to communicator 104. In another embodiment, communicator 104 may monitor presentation driver device 102 and determine when a new page has been displayed. Communicator 104 is then configured to determine the current slide being displayed and send a message to mobile devices 202 and 204 that indicates which slide is being displayed. Also, mobile devices 202 may query communicator 104 for the slide to display. The messaging may be different between mobile devices depending on if the mobile device does or does not have access to slides in presentation 112.

In the case where the mobile device can retrieve slides in presentation 112, communicator 104 sends a message that causes mobile device 202 to display current slide 208 on a display 214. The message may be sent using any communication means that can be used to contact device 202, such as short message service (SMS), multimedia messaging service (MMS), email, wireless application protocol (WAP) Push, General Packet Radio System (GPRS) Push, etc.

As shown, mobile device 202 includes a database 210 that stores presentation 112. Although database 210 is shown in mobile device 202, database 210 may be located remotely from mobile device 202. In this case, mobile device 202 may retrieve pages in presentation 112 from the remotely located database 210. For example, presentation 112 may be located on a server and mobile device 202 can request a web page that would include current slide 208.

Processor 212 is configured to display the next slide in presentation 112 on a display 214 in response to the message. For example, the message may indicate that a new slide has been displayed. In another embodiment, the message may identify the slide that is currently being displayed. Processor 212 will then retrieve that slide from database 210. For example, a page or slide number may be sent to mobile device 202 and that page will be retrieved and displayed. Accordingly, a presentation may display slides out of order and mobile device 202 can still display the right slide. In either case, the message will cause mobile device 202 to automatically display the currently displayed slide in the presentation upon receiving the message. In another embodiment, a button or link may be automatically displayed where the new slide is displayed when the button is selected.

In the case where mobile device 204 cannot retrieve slides in presentation 112, communicator 104 sends a message with current slide 208. The message may be sent using MMS or any other methods that may send the page to mobile device 204. Also, a remote server containing a copy of presentation 112 may be used to send current slide 208 to mobile device 204 instead of communicator 104. In this case, communicator 104 sends a message to the server and the server sends current slide 208 to mobile device 204. For example, mobile device 204 may download web pages that display current slide 208.

In one embodiment, the slide may be adapted to characteristics associated with different mobile devices. For example, the slide may have been designed using hypertext markup language (HTML) or a Microsoft Powerpoint™ format but mobile device 204 may only be able to display text pages. Communicator 104 can convert the slide to text and send the text page for display by mobile device 204. In another example, SMS messages may be the only way to reach mobile device 204. The HTML page may then be converted into text and sent in SMS messages to mobile device 204. Thus, the page may be sent through different communications methods and/or adapted to different display requirements.

In one embodiment, the messaging between communicator 104 and mobile device 204 is messaging that requires a low bandwidth. For example, SMS and MMS messages may be sent quickly through networks and are widely supported by many devices. However, in order to view a direct video link to a presentation, expensive and bulky equipment is often needed. Also, a high bandwidth connection is needed.

Once mobile device 204 receives current slide 208, the message causes processor 212 to automatically display current slide 208 on a display 216. In another embodiment, mobile device 204 may forward the slide to a fax machine or printer so the page can be faxed or printed. The slide may then be viewed in the hard copy form from the copy generated by the fax machine or printer.

In one embodiment, communicator 104 may not be able to send a message with current slide 208 to mobile device 204. In this embodiment, a message with a link, such as a uniform resource locator (URL), may be sent to mobile device 204. The link may be used to download a web page that displays current slide 208. The web page may include options that allow the user to choose a format to adapt current slide 208 to the specifications of mobile device 204. Mobile device 204 may also send this URL to other devices allowing other users to view slides in presentation 112.

In another embodiment, communicator 104 may cause another device that includes presentation 112 to send current slide 208 to mobile device 204. For example, upon receiving a message that a new slide has been displayed, mobile device 202 sends the new slide from its database 210 to mobile device 204.

In another embodiment, mobile device 202 and mobile device 204 may not receive messages initiated by communicator 104; rather, mobile device 202 and 204 may monitor communicator 104 to determine if a page in presentation 112 has been changed. For example, mobile devices 202 and 204 may check periodically (e.g., every couple of seconds) to determine if a page has been changed. If a page has changed, mobile device 202 may determine which page is currently being displayed or mobile device 204 may retrieve the currently displayed page from communicator 104.

In another embodiment, mobile device 202 or 204 may need to know the current slide being displayed. For example, a mobile user may be late for the meeting and instead of interrupting the meeting by asking what page is being displayed, the user uses mobile device 202 or 204 to query communicator 104 for the currently displayed page. In this case, communicator 104 will either send a message to mobile device 202 indicating which slide is being displayed or send current slide 208 to mobile device 204.

Figure 3:
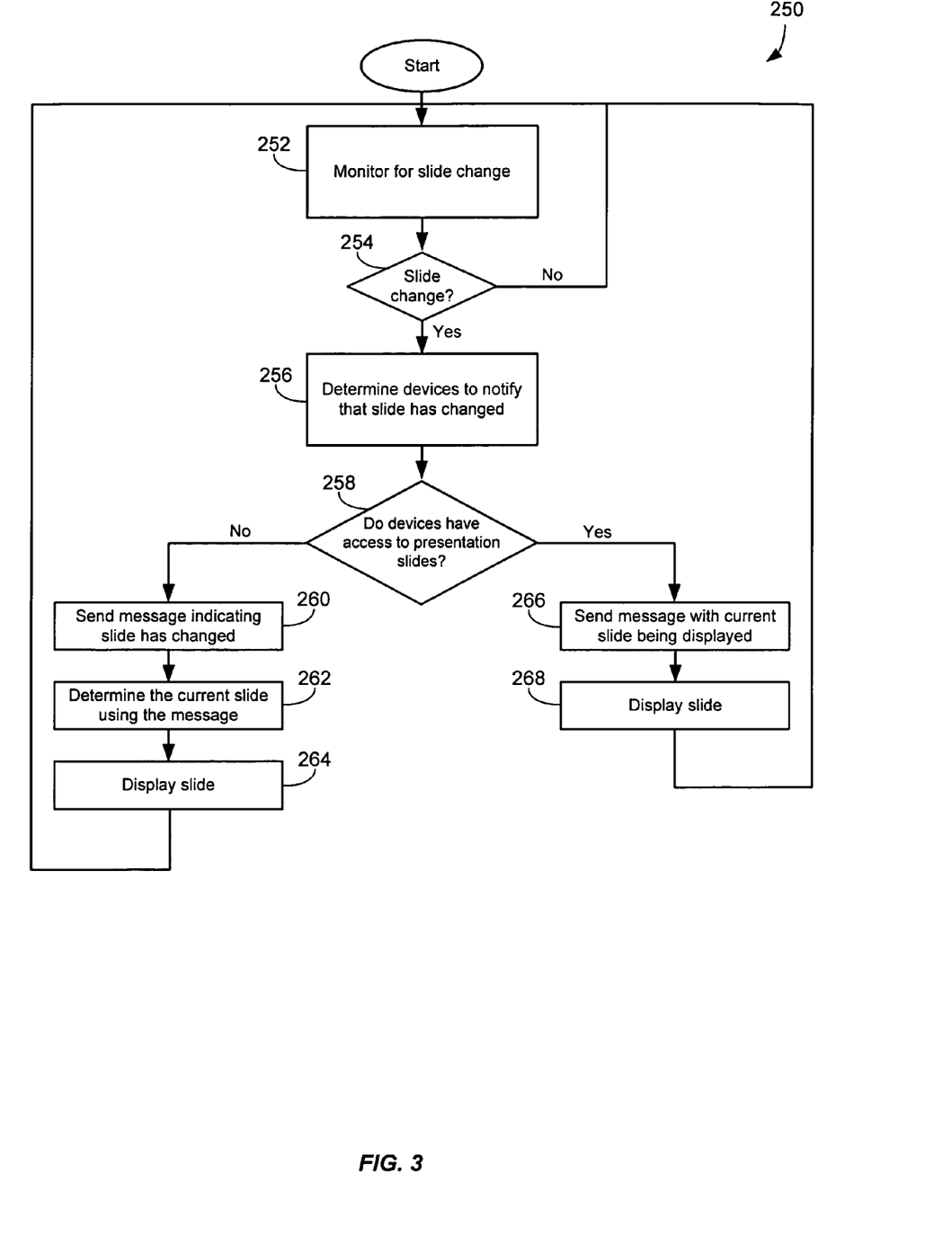
FIG. 3 depicts a flowchart of a method for synchronizing mobile devices with displayed slides in a presentation according to one embodiment of the present invention.

FIG. 3 depicts a flowchart 250 of a method for synchronizing mobile devices with displayed slides in a presentation according to one embodiment of the present invention. In step 252, communicator 104 monitors presentation driver device 102 for changes in displayed slides. Driver device 102 may send messages to communicator 104 or communicator 104 may periodically send requests to driver device 102 to determine if a new slide has been displayed.

In step 254, communicator 104 determines if a slide has changed. If a new slide has not been displayed, communicator 104 continues to monitor for slide changes in step 252.

If a new slide has been displayed, in step 256, communicator 104 determines devices that are participating in the presentation. For example, mobile devices, personal computers, televisions, etc. may need to display the new slide. In order to determine the devices, communicator 104 may require that devices have previously registered for participation in the meeting. In registering, the devices may configure the communication methods in which communicator 104 will send messages. For example, mobile devices may be sent messages through SMS and MMS, televisions may be sent messages through a video link, etc.

In step 258, after determining the devices that need the slide, communicator 104 determines if the devices can access slides of presentation 112. If the devices cannot access the slides, in step 260, communicator 104 sends a message indicating that a slide has changed to the devices. The message may specify a slide (e.g., a slide number) that should be displayed. Also, the message may just indicate that a slide has changed and the devices will determine which slide to display (e.g., the next slide).

In step 262, the devices determine the current slide 208 being displayed using the message. In step 264, current slide 208 is displayed on the devices. In one embodiment, current slide 208 is automatically displayed without any input from a user of the device. The method then reiterates to step 252 where communicator 104 monitors for the next slide change.

In the case where the devices do not have access to slides of presentation 112, in step 266, communicator 104 sends a message including the newly displayed slide 208 to the devices. Instead of including the slide, a link to current slide 208 that may be used to download the slide may also be sent. In either case, current slide 208 is sent to the devices.

In step 268, current slide 208 is displayed on the devices. In one embodiment, current slide 208 is automatically displayed without any input from a user of the device. The method then reiterates to step 252 where communicator 104 monitors for the next slide change.

Figure 4:
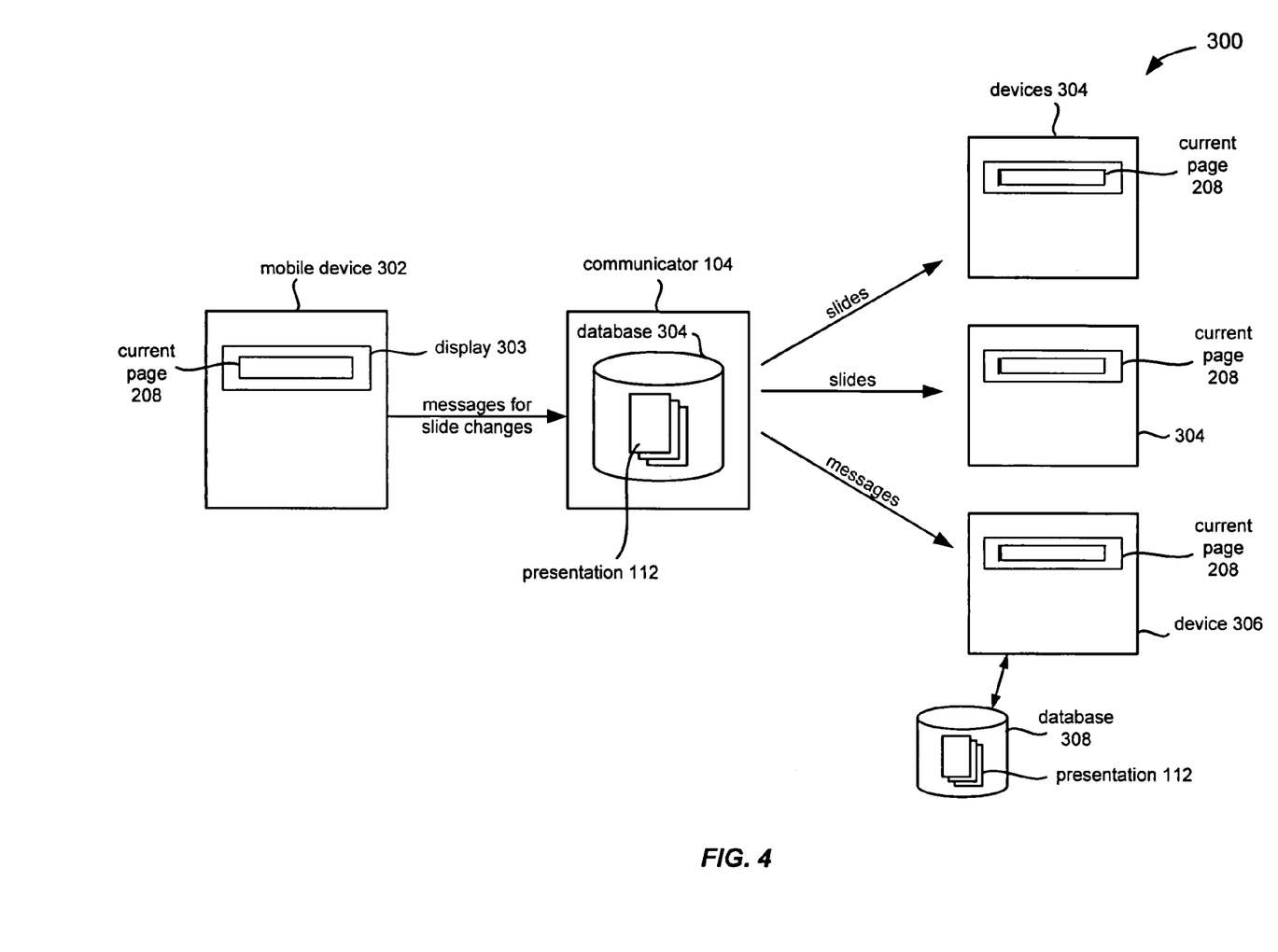
FIG. 4 depicts an embodiment of a system that enables a mobile device to run a presentation.

In addition to participating in a presentation being given, a user may use a mobile device to give a presentation. FIG. 4 depicts an embodiment of a system 300 that enables a mobile device 302 to run a presentation. As shown, mobile device 302 runs a presentation through communicator 104. In one embodiment, mobile device 302 determines when a new slide of presentation 112 has been displayed on a display 303 of mobile devices 302. When a slide has been changed, mobile device 302 sends a message indicating that a slide has been changed to communicator 104. The message may indicate which slide is being displayed or may indicate that a slide has been changed. Although mobile device 302 is shown as displaying current slide 208, it will be understood that mobile device 302 does not have to display current slide 208. For example, a person may be giving a presentation and when slides in presentation 112 are changed, the person selects a key on mobile device 302 or uses any other methods to indicate that a slide has been changed.

After receiving a message that a slide has been changed, communicator 104 sends messages to devices that are participating in the presentation. The devices may be display devices, computing devices, servers connected to a network of computing devices, other mobile devices, etc. Communicator 104 then determines the current slide that is being displayed using the received message and retrieves the slide from a database 304. Although communicator 104 is shown including database 304, it will be understood that database 304 may be remotely located but accessible by communicator 104.

Once current slide 208 is determined, communicator 104 may send it to devices 304 for display. Alternatively, communicator 104 may send a message to a device 306 that includes slides from presentation 112. Device 306 may then access the current slide 208 from a database 308 and display it. In one embodiment, when a slide is changed by mobile device 302, current slide 208 is displayed on devices 304 and 306 without any input from a user. Thus, participants may view slides in a presentation without manually changing them allowing a user of a mobile device to run a presentation remotely. For example, a user may be at an airport and other participants may be in a meeting room. The user can talk through mobile device 302 and also use mobile device 302 to automatically change slides on a television in the meeting room.

Accordingly, embodiments on the present invention allow a user to participate in a meeting using a mobile device. The pages displayed on the mobile device may be synchronized with page changes as new pages are being displayed in the presentation. A user thus does not have to manually change pages or receive verbal notifications that the page has been changed. Additionally, a video conference link is not necessary. It will be recognized that messages may be sent in a streaming media form.

Also, a user may give a presentation using a mobile device. The mobile device determines when a page has been changed and automatically sends a message that causes the new page to be displayed on other devices participating in the presentation.

Figure 5:
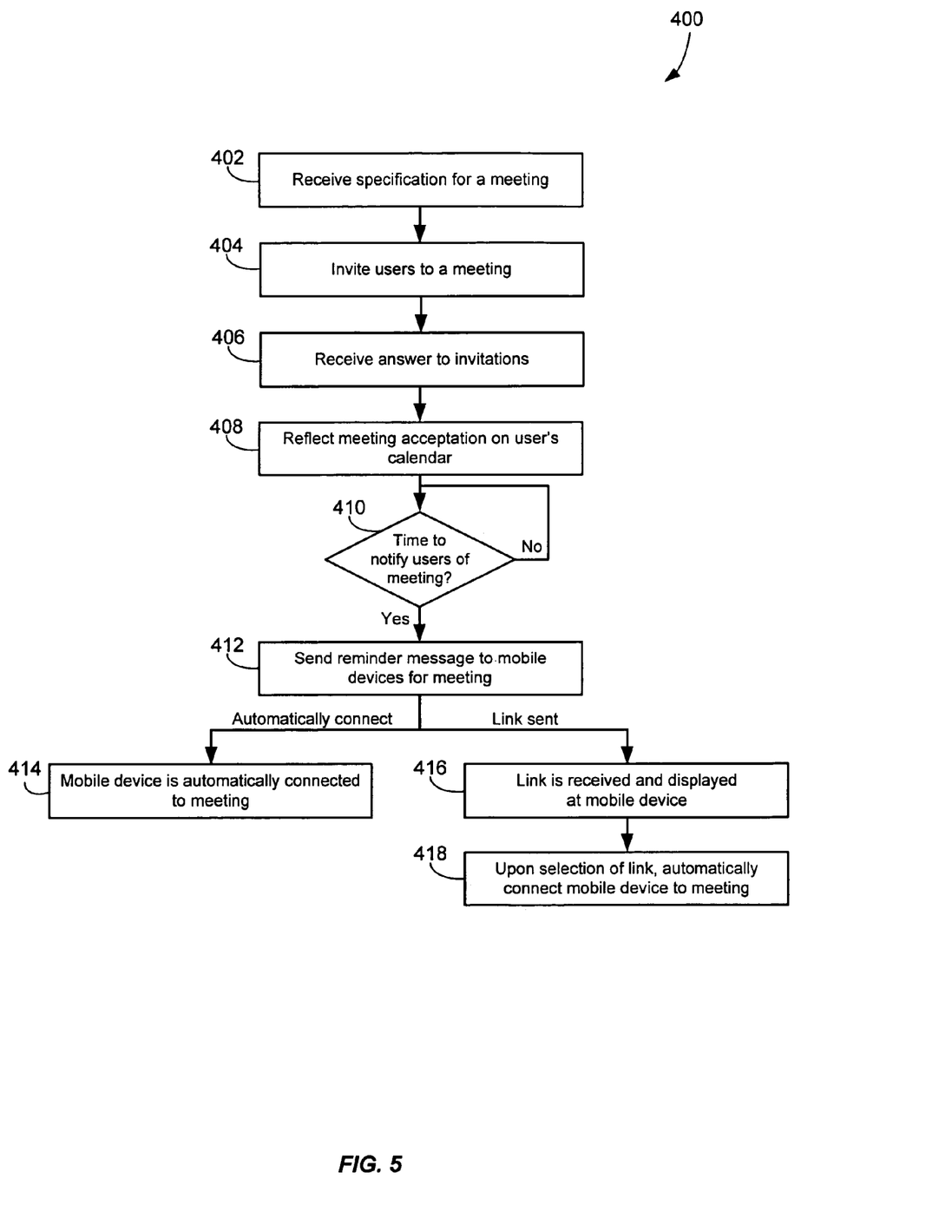
FIG. 5 depicts a flow chart of a method for automatically connecting to a meeting using a mobile device according to one embodiment of the invention.

In addition to being able to participate and run a presentation, a user may set up a meeting and/or be reminded of a meeting using a mobile device. When the user of a mobile device is notified of a meeting, the mobile device is provided methods for automatically connecting to the meeting. FIG. 5 depicts a flow chart 400 of a method for automatically connecting to a meeting using a mobile device according to one embodiment of the invention.

In step 402, specifications for a meeting are received. For example, a user may specify the desired participants in the meeting, a meeting time, a type of meeting (tele-conference, video conference, presentation, etc.), rooms to reserve, what kind of devices will be connected to the meeting, what the device capabilities are and their preferences, etc. Examples of device capabilities may include how the device will participate in the meeting, such as using SMS, NMS, email, a voice call, a video conference, a web call, a presentation, etc.

In one embodiment, the mobile device may be configured to access standard meeting software, such as conference call notification by Lotus Notes, conference call setup by Raindance, Idem for on-line meetings, free-busy services for Microsoft Outlook, freetime/scheduling for Oracle calendar, Oracle Collaboration Suite (OCS), and the like. The mobile device sends messages to a central coordinator, such as communicator 104, to schedule the meeting. The messages may be SMS messages, emails, MMS messages, voice messages, fax messages, etc. Communicator 104 is configured to interpret the messages and schedule the meeting using the appropriate software. For example, an SMS message may request that a meeting be scheduled using Lotus Notes at a certain time for people named Rob Smith and Jack Johnson. Communicator 104 would then access Lotus Notes for the user of the mobile device and attempt to schedule the meeting at the specified time for the users, Rob Smith, and Jack Johnson.

In one embodiment, a mobile device may issue an invitation by contacting communicator 104 with a request for a meeting. Also, the mobile device may initiate a meeting request by entering the meeting into his/her mobile device's calendar. Then, the mobile device may automatically send the invitation to communicator 104, which will send the invitations to other devices.

In step 404, invitations are sent to various mobile devices and other devices associated with users that will be participating in the meeting. Invitations may be sent through email, SMS, MMS, voicemail, voice calls, fax messages, etc. The invitations may describe the meeting details and also offer options to accept or reject the invitation. For example, a form may be provided with a question that requires a user to accept or reject the invitation for the meeting. Additionally, the form may give details about the meeting, such as a phone number to call in case the device is disconnected, the time of the meeting, etc. The invitations may also be adapted to requirements for the mobile device. For example, a voice message may sent if SMS messages cannot be received by a mobile device, the form may be in HTML, text or any other format the specific device can display, etc.

In step 406, acceptances and rejections are received. In one embodiment, a mobile device user may accept the invitation by using a browser to download a webpage that enables the user to accept the invitation. Also, the mobile device may be used to accept the invitation via voice interaction using voice recognition or by using text messaging (SMS, MMS, email, instant message, etc.).

In step 408, the acceptances may be reflected on the calendars of all participants and are stored. The synchronization of the calendars may be updated on any devices using over the air (OTA) vCal or iCal, syncML, synchronization (e.g., via Outlook), replications (e.g., via Lotus Notes) or any other methods needed to perform the update.

In step 410, communicator 104 determines if it is time to notify a user of a meeting. The notification may come before the meeting when the meeting is about to start, or even after the meeting if the user has not connected to the meeting yet. If it is time to remind a user of a meeting, in step 412, communicator 104 sends a reminder message to one or more mobile devices and other devices for the meeting. In one embodiment, the message may cause the mobile device to automatically connect to the meeting when it is received. In another embodiment, a link or button may be displayed that may cause the mobile device to automatically connect to the meeting when selected.

In the case where a mobile device is automatically connected to a meeting, in step 414, when the mobile device receives the message, the message automatically connects the mobile device to the meeting. For example, the message may cause the mobile device to call a number to connect to a tele-conference. Also, the message may automatically display a slide in a presentation that is being given. Moreover, the message may automatically connect to any on-line meetings, such as an instant message session with a user, a chat, a multimedia presentation, a video conference, and the like.

In the case where a link is sent, in step 416, the link is received and displayed on the mobile device. In one embodiment, the link may be a selectable button that is configured to connect to the meeting when selected. In other embodiments, the link includes meeting details, such as the call number, password, meeting title, participants, universal resource identifiers (URIs), etc. Although this information is given, the link will still automatically connect the mobile device to the meeting when selected.

In step 418, upon selection of the link, the mobile device is automatically connected to the meeting. For example, when a link is selected, a telephone number is dialed to join a telephone conference or the mobile device may be connected to an online meeting using instant messaging, an online presentation, a multimedia presentation, a video conference, an online chat, etc.

If a link does not work, in one embodiment, the mobile device may be contacted to give the user information to connect to the meeting, files for the presentation, or start streaming multimedia information to the mobile device.

In another embodiment, the user can contact communicator 104. For example, messaging can be used to indicate new instructions, such as an address or telephone number and instructions on what to do in order to contact the user, for example, information on where to send, fax or print the presentation, information on where to call for the meeting, etc.

Accordingly, embodiments on the present invention allow a user of a mobile device to be automatically connected to a meeting. Thus, a user does not need to know the specifics of how to connect to the meeting because either a message causes the mobile device to connect to the meeting automatically or a link is provided that causes the mobile device to connect to the meeting upon selection. This may be very useful when a user is traveling and does not have access to information about the meeting. Thus, a user may be reminded about the meeting and also be automatically connected to the meeting using the reminder.

In one embodiment, instant messaging may also be used by the present invention. For example, a chat or instant message system may be used between the mobile device and communicator 104. Instant messages may include invitations to participate in the meeting, notifications that a page has been changed in the meeting, notifications that a meeting is about to start, notifications that may be used to automatically connect to the meeting, etc. Instant message clients may also be used to send slides of presentations to mobile devices.

Embodiments of the present invention provide many advantages. For example, mobile devices may participate in a presentation by having slides automatically displayed. Typically, a high bandwidth connection is needed for devices such as laptops to link to a presentation driver device. However, using a communicator, messages in other channels, such as SMS and MMS, are used to cause a mobile device to display slides in a presentation. Thus, a mobile device that normally is not configured to directly interact with a presentation driver device can participate and display slides in a presentation.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for enabling a mobile device to view one or more slides in a presentation, the method comprising:
   determining when slides for the presentation have been changed;
   in response to determining when a slide has been changed, performing the steps of:
      determining a current slide in the one or more slides being displayed; and
      sending a message, to the mobile device, without a multimedia communication session connection with the mobile device, the message indicating that the current slide has been displayed, wherein the message enables the current slide to be displayed on the mobile device.

2. The method of claim 1, wherein the mobile device can retrieve the one or more slides in the presentation, wherein the mobile device displays the current slide upon receiving the message.

3. The method of claim 1, wherein the steps performed in response to determining when a slide has been changed further include:
   determining whether the mobile device is able to retrieve the one or more slides in the presentation;
   responsive to the determination that the mobile device is able to retrieve the one or more slides, a content of the sent message indicating a slide identifier corresponding to the current slide, wherein the mobile device uses the slide identifier to retrieve the slide; and
   responsive to the determination that the mobile device is not able to retrieve the one or more slides, a content of the sent message including data comprising the current slide, wherein the message enables the current slide to be automatically displayed on the mobile device.

4. The method of claim 1, further comprising determining a slide to display using the message.

5. The method of claim 4, wherein determining the slide comprises displaying a next slide in the presentation.

6. The method of claim 1, wherein the message, upon selection, causes the new slide to be displayed on the mobile device.

7. The method of claim 1, wherein determining when slides have been changed comprises:
   monitoring a device causing the presentation to be displayed; and
   determining when slides have been changed.

8. The method of claim 1, wherein determining when slides have changed comprises receiving an indication when slides have been changed.

9. The method of claim 1, wherein the message comprises at least one of a short message service (SMS) message, an instant message, an email, a multimedia message service (MMS) message, and a uniform resource locator (URL).

10. The method of claim 1, further comprising:
    receiving a request from the mobile device for a status check on the presentation; and
    sending a message indicating which slide in the one or more slides is currently being displayed for the presentation.

11. The method of claim 1, wherein the mobile device sends requests to detect when a new slide is displayed.

12. The method of claim 1, wherein sending the message comprises sending a message including the current slide being displayed to the mobile device, wherein the message enables the current slide to be automatically displayed on the mobile device.

13. The method of claim 12, wherein the current slide is sent using MMS.

14. The method of claim 12, wherein the message includes a uniform resource locator (URL), wherein the URL enables the mobile device to download the new slide.

15. The method of claim 12, wherein the message, upon selection, causes the new slide to be displayed on the mobile device.

16. The method of claim 12, further comprising:
adapting the new slide to characteristics associated with the display of the new slide, wherein the new slide would not have been displayable by the mobile device before adaptation; and
sending the adapted slide to the device, wherein the mobile device is able to display the adapted slide.

17. The method of claim 12, further comprising:
adapting the new slide to characteristics associated with the communication of the new slide to the device, wherein the new slide would not have been communicable by the mobile device before adaptation; and
sending the adapted slide to the device, wherein the mobile device is able to receive the adapted slide.

18. A method for running a presentation of one or more slides from a mobile device, the presentation being viewed by one or more participants using one or more computing devices that are in communication with one or more display devices associated with the one or more participants, the method comprising:
receiving a message to display a new slide for the presentation from the mobile device that is remotely located from the one or more display devices;
determining the one or more display devices that are participating in the meeting; and
sending a message indicating that a new slide should be displayed to each of the one or more display devices, without a multimedia communication session connection with the one or more display devices, wherein the message causes the one or more display devices to display the new slide.

19. The method of claim 18, wherein the new slide that is sent is adapted to display characteristics of each of the one or more display devices.

20. The method of claim 19, wherein the new slide that is sent is adapted to communication characteristics associated with each of the one or more display devices, wherein the new slide could not have been sent to any of the one or more display devices without adaptation.

21. The method of claim 18, wherein the steps performed in response to determining when a slide has been changed further include:
determining whether the mobile device is able to retrieve the one or more slides in the presentation;
responsive to the determination that the mobile device is able to retrieve the one or more slides, a content of the sent message indicating a slide identifier corresponding to the current slide, wherein the mobile device uses the slide identifier to retrieve the slide; and
responsive to the determination that the mobile device is not able to retrieve the one or more slides, a content of the sent message including data comprising the current slide, wherein the message enables the current slide to be automatically displayed on the mobile device.

22. The method of claim 18, wherein the received message is sent by the mobile device using at least one of a short message service (SMS), an instant message, or email, and a multimedia message service (MMS).

23. A computer program product embedded in a computer readable medium for enabling a mobile device to view one or more slides in a presentation, comprising:
program code for determining when slides for the presentation have been changed;
in response to determining when a slide has been changed, program code for determining a current slide in the one or more slides being displayed; and
program code for sending a message, to the mobile device, without a multimedia communication session connection with the mobile device, the message indicating that the current slide has been displayed, wherein the message enables the current slide to be displayed on the mobile device.

24. The computer program product of claim 23, wherein the mobile device can retrieve the one or more slides in the presentation, wherein the mobile device displays the current slide upon receiving the message.

25. The computer program product of claim 23, wherein the steps performed in response to determining when a slide has been changed further include:
determining whether the mobile device is able to retrieve the one or more slides in the presentation;
responsive to the determination that the mobile device is able to retrieve the one or more slides, a content of the sent message indicating a slide identifier corresponding to the current slide, wherein the mobile device uses the slide identifier to retrieve the slide; and
responsive to the determination that the mobile device is not able to retrieve the one or more slides, a content of the sent message including data comprising the current slide, wherein the message, upon selection, causes the current slide to be displayed on the mobile device.

26. The computer program product of claim 23, wherein the message comprises at least one of a short message service (SMS) message, an instant message, an email, a multimedia message service (MMS) message, and a uniform resource locator (URL).

27. The computer program product of claim 23, wherein the program code for sending the message comprises program code for sending a message including the current slide being displayed to the mobile device, wherein the message enables the current slide to be automatically displayed on the mobile device.

28. The computer program product of claim 27, further comprising:
program code for adapting the new slide to characteristics associated with the display of the new slide, wherein the new slide would not have been displayable by the mobile device before adaptation; and
program code for sending the adapted slide to the device, wherein the mobile device is able to display the adapted slide.

29. The computer program product of claim 27, further comprising:
program code for adapting the new slide to characteristics associated with the communication of the new slide to the device, wherein the new slide would not have been communicable by the mobile device before adaptation; and program code for sending the adapted slide to the device, wherein the mobile device is able to receive the adapted slide.

30. A computer program product embedded in a computer readable medium for running a presentation of one or more slides from a mobile device, the presentation being viewed by one or more participants using one or more computing devices that are in communication with one or more display devices associated with the one or more participants, comprising:

program code for receiving a message to display a new slide for the presentation from the mobile device that is remotely located from the one or more display devices;

program code for determining the one or more display devices that are participating in the meeting; and program code for sending a message indicating that a new slide should be displayed to each of the one or more display devices, without a multimedia communication session connection with the one or more display devices, wherein the message causes the one or more display devices to display the new slide.

31. The computer program product of claim 30, wherein the new slide that is sent is adapted to display characteristics of each of the one or more display devices.

32. The computer program product of claim 31, wherein the new slide that is sent is adapted to communication characteristics associated with each of the one or more display devices, wherein the new slide could not have been sent to any of the one or more display devices without adaptation.

33. The computer program product of claim 30, wherein the received message is sent by the mobile device using at least one of a short message service (SMS), an instant message, or email, and a multimedia message service (MMS).

* * * * *

UNITED STATES PATENT AND TRADEMARK OFFICE
CERTIFICATE OF CORRECTION

PATENT NO. : 7,379,733 B2 Page 1 of 1
APPLICATION NO. : 10/857659
DATED : May 27, 2008
INVENTOR(S) : Maes et al.

It is certified that error appears in the above-identified patent and that said Letters Patent is hereby corrected as shown below:

In column 7, line 56, delete "NMS" and insert -- MMS --, therefor.

Signed and Sealed this

Seventh Day of July, 2009

JOHN DOLL
*Acting Director of the United States Patent and Trademark Office*